Figure 5:
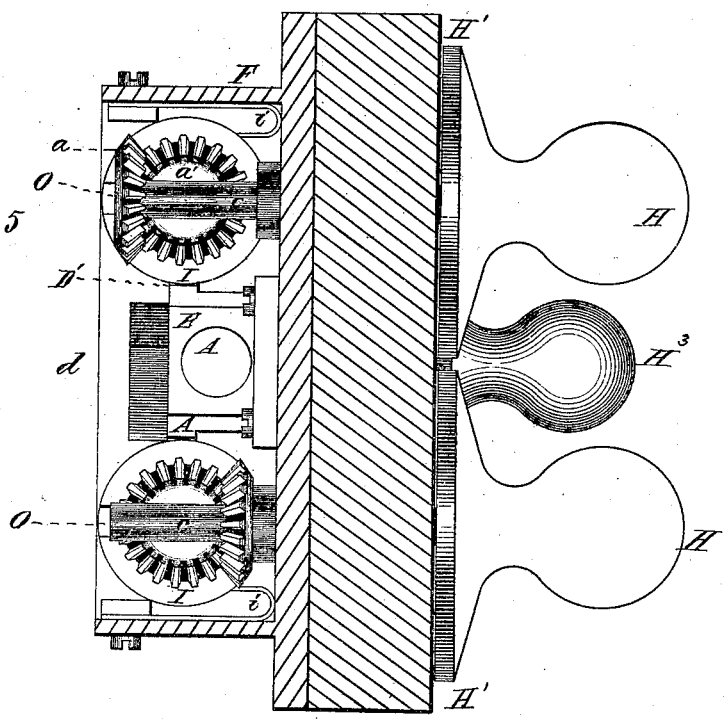

2 Sheets--Sheet 1.
H. C. THRALL.
Improvement in Permutation-Locks.
No. 131,576.    Patented Sep. 24, 1872.
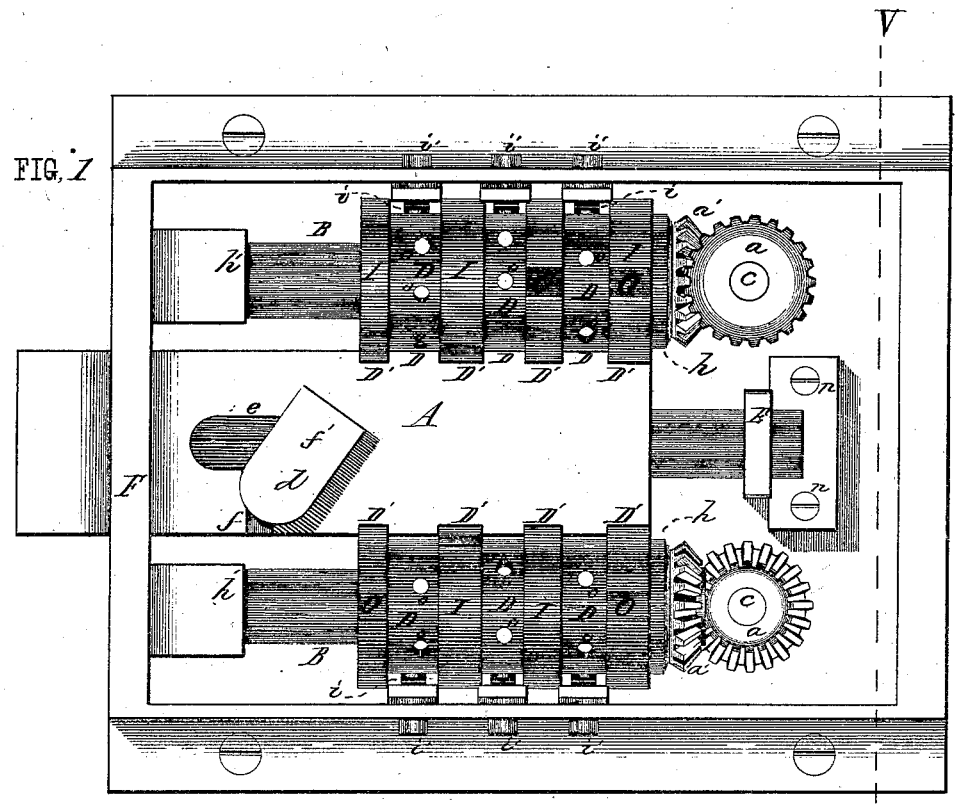
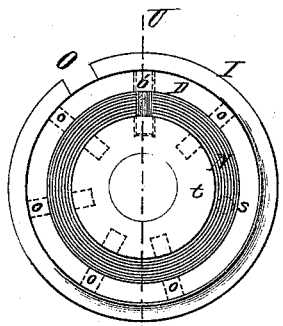
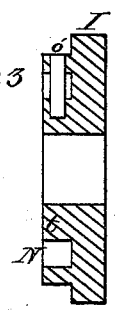
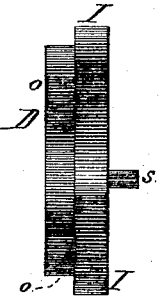

2 Sheets--Sheet 2.

H. C. THRALL.

Improvement in Permutation-Locks.

No. 131,576. Patented Sep. 24, 1872.

Witnesses,
C. E. Foyard
M. L. Boynton.

Inventor,
Henry C. Thrall.
By J. H. Curtis, his Atty.

UNITED STATES PATENT OFFICE.

HENRY C. THRALL, OF SPRINGFIELD, MASSACHUSETTS.

IMPROVEMENT IN PERMUTATION LOCKS.

Specification forming part of Letters Patent No. 131,576, dated September 24, 1872.

*To all whom it may concern:*

Be it known that I, HENRY C. THRALL, of Springfield, in the county of Hampden and State of Massachusetts, have invented a new and useful Improvement in Combination Locks; and I do hereby declare that the following is a full, clear, and exact description thereof, reference being had to the accompanying drawing making a part of this specification and to the letters of reference marked thereon, in which—

Figure 1 is an inside view of the lock with the back of the case removed. Fig. 2 is an end view of one of the wheels somewhat enlarged to show details of construction. Fig. 3 is a vertical transverse section of the wheel through line U of Fig. 2. Fig. 4 is a side view of one of the wheels enlarged; and Fig. 5 is a vertical transverse section of the lock through line V of Fig. 1.

My invention relates to that class of locks in which the bolt is secured in place when thrown out by a series or combination of rotary wheels, and operated by a knob and index upon the outside of the lock; and it consists in the construction and arrangement of a series of rotating wheels upon a shaft extending parallel with the bolt inside the lock, and said wheels have each an annular flange, in which is a recess of sufficient width to permit the bolt to slide longitudinally through the same when said wheels are turned in the proper position for that purpose; and the edge of the bolt has transverse recesses therein, corresponding in size and position with the annular flanges of the rotating wheels, so that the flanges of said wheels may turn freely in the recesses as they rotate. The wheels have each a pin projecting from one side in a line parallel with their axes, and said wheels have also a pin inserted in one of a series of radial holes made in the periphery of each wheel for that purpose, and these holes are made in each wheel, in series circumferentially side by side, but radially at small distances from each other, so that if a pin in one hole be taken out and placed in the nearest hole in the next series the pin will have changed position radially, only in a very minute degree. The first wheel of the series has a bevel-toothed wheel attached, and the spindle, to which is attached the knob, extends into the lock nearly to the back of the case, and has a bevel-toothed wheel attached, which engages with the toothed wheel attached to the first of the series of the rotating wheels.

That others skilled in the art may be able to make and use my invention, I will proceed to describe its construction and operation.

In the drawing, F represents the case of the lock, and B a shaft having its bearing at $h'$, upon which are arranged the wheels D so as to rotate freely thereon, and these wheels have an annular flange, I, thereon, and have also different series of holes $o$ made in their peripheries, and these holes differ in their position radially in the different series, as shown clearly in Fig. 1. The bolt A has its bearings at one end in the case F, and at the other end in a guide-piece, E, secured to the inside of the case, and the bolt has a series of notches or recesses, D', made therein, of a size to admit the flange I of the wheels D, and the bolt has a longitudinal slot or opening, $e$, therein, and also a smaller vertical slot, $f$. The spindle $f'$ extends entirely through the lock-case and also through the slot $e$ in the bolt, and upon the inner end of the spindle is firmly secured a lever, $d$, having upon the lower end a pin or projection extending into the slot $f$. The first wheel upon the shaft B has a bevel-toothed wheel, $a'$, attached to its hub $h$, and a corresponding bevel-toothed wheel, $a$, is attached to the spindle $c$, which extends through the lock to its outside, in front, and to the outer end is secured a knob, H, and disk H', the periphery of which has a scale marked thereon. The flange I of each wheel D has a transverse slot, O, therein, of sufficient depth and width to admit the edge of the bolt A, and a pin or screw, $o'$, is inserted in one of the holes $o$ in each wheel D, said pin or screw extending into the wheel across the channel N, its inner end having a bearing in the part $t$ of said wheel, as shown clearly in dotted lines in Figs. 2 and 3, and the pin $s$ is secured to said wheel, projecting out from said wheel upon the side opposite the channel N, and this pin is sufficiently long that when two of the wheels are placed side by side said pin upon one wheel projects into the annular channel N in the next wheel, and is sufficiently long to strike against the pin $o'$ in whichever series of holes $o$ it may be placed. The side of the flange I, on each wheel D, may be graduated by radial marks of the same distance apart as the distance between one of the holes o in one of the series and the next hole in the next series, and these graduations may be numbered at certain intervals; and the number of graduations around the flange I should correspond with the number of those around the periphery of the disk H' on the knob. The friction-springs $i$, attached to the case by screws $i'$ and bearing against the periphery of the wheels D, serve to prevent said wheels from turning upon the shaft B by their own momentum when started quickly.

The operation of my invention is as follows: The pin $o'$ is put into one of the holes $o$ in either of the series in each wheel D, and the number of the mark on each flange is noted, opposite each pin, in each wheel, from the first wheel to the last. If the bolt A be thrown out, and it is required to unlock it or throw the bolt in, the knob having the disk H' is turned three times around until the pointer on the front of the lock points to the number corresponding to the number on the flange opposite the pin $o'$ in the last wheel D. The knob is then turned in the opposite direction twice around until the pointer points to the number on the disk H' corresponding to the number on the flange opposite the pin $o'$ in the third wheel, and so on until the knob and its disk H' has been turned to all the numbers indicated by the several pins $o'$ in the different wheels D, when it will be found that the slots O in the flanges I of all the wheels D are in line with each other, and in position to allow the bolt A to move to and fro in said slots, which is done from the outside by partially rotating the knob H and lever $d$, as shown in the drawing. The wheel to which the toothed wheel $a'$ is attached will always be moved to the same number, as there is no pin to be changed in that wheel, and the lock would be operated by three changeable numbers and one permanent number, but the latter could be dispensed with by making the first wheel, to which is attached the toothed wheel $a'$, without any flange, I, and making it only of sufficient thickness to firmly secure the pin $s$. Of course any desirable number of wheels D may be used, and every additional wheel will give an additional changeable number.

The following are some of the advantages of this construction and arrangement of the lock: I am enabled to place two different systems or series of wheels upon one bolt, each system or series being operated entirely independent of the other, and consequently by an entirely different combination of numbers, virtually making two separate and distinct locks in one—as in the drawing one system or series of wheels is shown above the bolt A and another system below the bolt, and each operated entirely independent of the other.

If the lock should be tampered with by burglars, and the spindle $c$ and knob H broken off and driven in, the toothed wheel $a$ would merely be driven in out of gear with the wheel $a'$, and the other operative parts of the lock would not be injured or disturbed thereby, and the result would only be greater difficulty in opening the lock.

If the spindle $f'$ and knob $H^3$ should be broken off and driven in, the bolt would not be injured thereby, as the lever $d$ and its projection thereon would be forced back and out of the slot $f$, so that the bolt could not be operated by said lever. Another advantage is that the combination of numbers may be easily changed at any time without removing from the lock its operative parts. In changing the combination of many of the best locks in common use it is necessary to remove the wheels to make such change. In this lock it is only necessary to take out the pin $o'$ in one or more of the wheels, as may be desirable, and insert it into any other of the holes $o$ without taking out any other part of the lock.

It will be easy to ascertain what numbers the pins are set to, after changing them, by turning the wheels D upon the shaft, so that the slots O in the flanges are in proper position, in line for the bolt A to move through them, and then by making a small hole through the back of the lock and into each flange it will be easy to set each wheel to the proper number by inserting a pin through each hole in the back of the lock, and pressing it against the flange, and then turning the knob until the pin drops into its hole in the flange, and then noting what numbers are indicated upon the disk of the operating knob.

The slot $f$ might be made in the back side of the lever $d$, and the pin be attached to the bolt, without departing from the principle of its operation.

Having thus described my invention, what I claim as new, and desire to secure by Letters Patent, is—

The wheels D, each having the slotted flange I and the holes $o$ arranged in the periphery thereof, the removable pin $o^1$, and the projection $s$, in combination with the toothed-wheels $a'$ and $a$, and the bolt A having notches D', all substantially as described.

HENRY C. THRALL.

Witnesses:
T. A. CURTIS,
M. L. BOYNTON.